United States Patent
Wu et al.

(10) Patent No.: US 7,913,017 B2
(45) Date of Patent: Mar. 22, 2011

(54) EMBEDDED SYSTEM AND INTERRUPTION HANDLING METHOD

(75) Inventors: Tse-Hong Wu, Hsinchu (TW); Liang-Yun Wang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 108 days.

(21) Appl. No.: 12/237,601

(22) Filed: Sep. 25, 2008

(65) Prior Publication Data
US 2010/0077120 A1 Mar. 25, 2010

(51) Int. Cl.
*G06F 13/24* (2006.01)
*G06F 13/26* (2006.01)

(52) U.S. Cl. ......... 710/266; 710/260; 710/265; 710/269

(58) Field of Classification Search .................. 710/260, 710/263–266, 269, 48, 50; 712/40, 244
See application file for complete search history.

(56) References Cited

U.S. PATENT DOCUMENTS

| | | | | |
|---|---|---|---|---|
| 5,381,552 A | * | 1/1995 | Dahlberg et al. | 710/264 |
| 6,654,839 B1 | * | 11/2003 | Hashimoto | 710/269 |
| 2002/0016880 A1 | * | 2/2002 | Bhagat | 710/261 |
| 2003/0074508 A1 | * | 4/2003 | Uhler | 710/260 |
| 2006/0064528 A1 | * | 3/2006 | Soltis et al. | 710/260 |

* cited by examiner

*Primary Examiner* — Thomas J Cleary
(74) *Attorney, Agent, or Firm* — Thomas | Kayden

(57) ABSTRACT

An embedded system and an interruption handling method are provided. A plurality of interruption requests are received, and corresponding service routines are triggered with priority control. In the embedded system, a memory device comprises a plurality of service routines stored at different entry addresses, each related to an interruption request. A processor receives an enable signal to initialize one of the service routines through a branch instruction. A control unit buffers the interruption requests to schedule executions of corresponding service routines. When a specific service routine is to be executed, the control unit provides the branch instruction pointing to entry address of the specific service routine and asserts the enable signal to the processor, such that the processor executes the branch instruction to initialize the specific service routine.

15 Claims, 4 Drawing Sheets

EMBEDDED SYSTEM AND INTERRUPTION HANDLING METHOD

BACKGROUND OF THE INVENTION

1. Field of the Invention

The invention relates to micro control units (MCU), and in particular to an embedded system handling interruption requests with priority control.

2. Description of the Related Art

FIG. 1 shows a conventional embedded system, in which a processor 110 is interruptible to provide particular services. For old type processor chips such as 8051 or ARM7, only a few ports, e.g. 2 ports, are implemented to receive interruption requests. In practice, the ports are referred to as #IRQ and #FIQ according to the specification. An interruption request asserted on the ports #IRQ of #FIQ may be originated from various events each requesting a different service routine. A plurality of events may simultaneously occur, and status registers 102 and 104 respectively associated to the ports #IRQ and #FIQ are provided to represent statuses of each event. Every bit (or may be byte) $R_0$ to $R_n$ in the status registers 102 and 104 may represent whether a particular event is requesting a service routine. When an event occurs, the status registers 102 or 104 is modified, and the interruption request is sent to the processor 110 as a trigger. The events may be defined with different priorities based on their importance, and conventionally, the priorities of the events are equal to precedence of the bits $R_0$ to $R_n$ where their statuses are stored.

The embedded system further comprises an interruption vector table 120 coupled to the processor 110, comprising two fields 122 and 124 each storing a branch instruction. For example, when an interruption request #INTa is asserted on the port #IRQ, the processor 110 suspends its current operation to execute the branch instruction in the IRQ field 122. Likewise, when the port #FIQ receives an interruption request #INTb, the processor 110 is interrupted to execute the branch instruction in the FIQ field 124. A branch instruction is typically a jump command followed by a destination address, acting as a program launcher that leads the processor 110 to access and execute a particular program in a memory device 130. As described, an interruption request may be asserted by various events, thus a determination mechanism is required before a corresponding service routine can be initialized. Specifically, the particular program referred by the branch instructions in the interruption vector table 120 is a priority control program for handling the events. The priority control programs 132 and 134, along with a plurality of service routines 136 each serving an event, may be provided by firmware or operating system and stored in the memory device 130. When an interruption request is received by the ports #IRQ or #FIQ, the processor 110 executes a corresponding branch instruction in the fields 122 or 124 to load the priority control program 132 or 134. By executing the priority control programs, statuses of the events recorded in the status registers 102 and 104 are sequentially scanned to accordingly trigger related service routines 136.

FIG. 2 is flowchart of conventional service routine executions. In the flowchart, a priority control program is executed to identify the source event which asserts the interruption request. In practice, the bits $R_0$ to $R_n$ in the status register 102 or 104 are recursively scanned. Since one of the bits $R_0$ to $R_n$ represents status of one event, if one of the bits is found asserted, a corresponding service routine 136 is loaded for execution. In step 200, the priority control program is initialized to scan the status register 102 or 104. In step 202, the first bit $R_0$ is scanned, determining whether a first event is requesting a first service routine. If so, step 212 is processed, the first service routine is executed. Otherwise, a next bit is scanned in step 204. When the execution of first service routine in step 212 is completed, the process may go to step 204 for a next bit scanning, or loop back to step 202 via the dot line 299 to start over the scanning. In step 204, a second bit $R_1$ is likewise scanned, whereby a second service routine may be triggered in step 214 if a positive value is detected in the second bit R1. Similarly, when step 214 is completed, a next bit scanning may further be proceeded, or alternatively, the scanning process may be reset to go back to step 202. The scanning and execution repeat until all bits in the status register 102 or 104 are scanned.

The described method for handling interruption requests is typically a software based implementation. The branch instructions 122 and 124 are executed by the processor 110 upon the ports #IRQ and #FIQ are respectively asserted by events, and consequently, the priority control programs 132 and 134 are executed by the processor 110 to scan status register 102 and 104. In this way, a service routine corresponding to the source event can be found and executed. Priorities of the events are simply defined by precedence of their corresponding bits in the status register 102 and 104, and the priority policy can be flexibly modified by redefining different scanning order in the priority control programs 132 and 134. The software based implementation, however, is deemed ineffective as it consumes processor resources. More than that, when a large number of interruption requests are simultaneously asserted, services routines of lower priority may be infinitely put off that causing undeterminable system dead lock. Hence an enhancement is therefore desirable.

BRIEF SUMMARY OF THE INVENTION

An exemplary embodiment of an embedded system is provided to implement an interruption handling method of the invention. A plurality of interruption requests are received, and corresponding service routines are triggered. In the embedded system, a memory device comprises a plurality of service routines stored at different entry addresses, each related to an interruption request. A processor receives an enable signal to initialize one of the service routines through a branch instruction. A control unit buffers the interruption requests to schedule executions of corresponding service routines. When a specific service routine is to be executed, the control unit provides the branch instruction pointing to entry address of the specific service routine and asserts the enable signal to the processor, such that the processor executes the branch instruction to initialize the specific service routine.

The control unit further comprises a scheduler, whereby a plurality of different interruption requests are individually received through a plurality of ports. Priorities of the interruption request are programmable, whereby the scheduler asserts the enable signal to sequentially handle the buffered interruption requests based thereon.

The embedded system may further comprise an interruption vector table coupled to the processor, comprising at least one field storing the branch instruction. The control unit comprises a spare vector table, storing a plurality of branch instructions each destined to a corresponding service routine in the memory device.

In one embodiment, the control unit remaps the interruption vector table to the spare vector table when the specific service routine is to be executed, such that the processor is able to access and load the branch instruction destined to the specific service routine from the spare vector table instead of from the field in the interruption vector table.

Alternatively, a modifier is provided, controlled by the scheduler to modify the field in the interruption vector table. When the specific service routine is to be executed, the modifier copies the branch instruction destined to the specific service routine from the spare vector table to the field in the interruption vector table, such that the processor is led to access the particular service routine accordingly. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
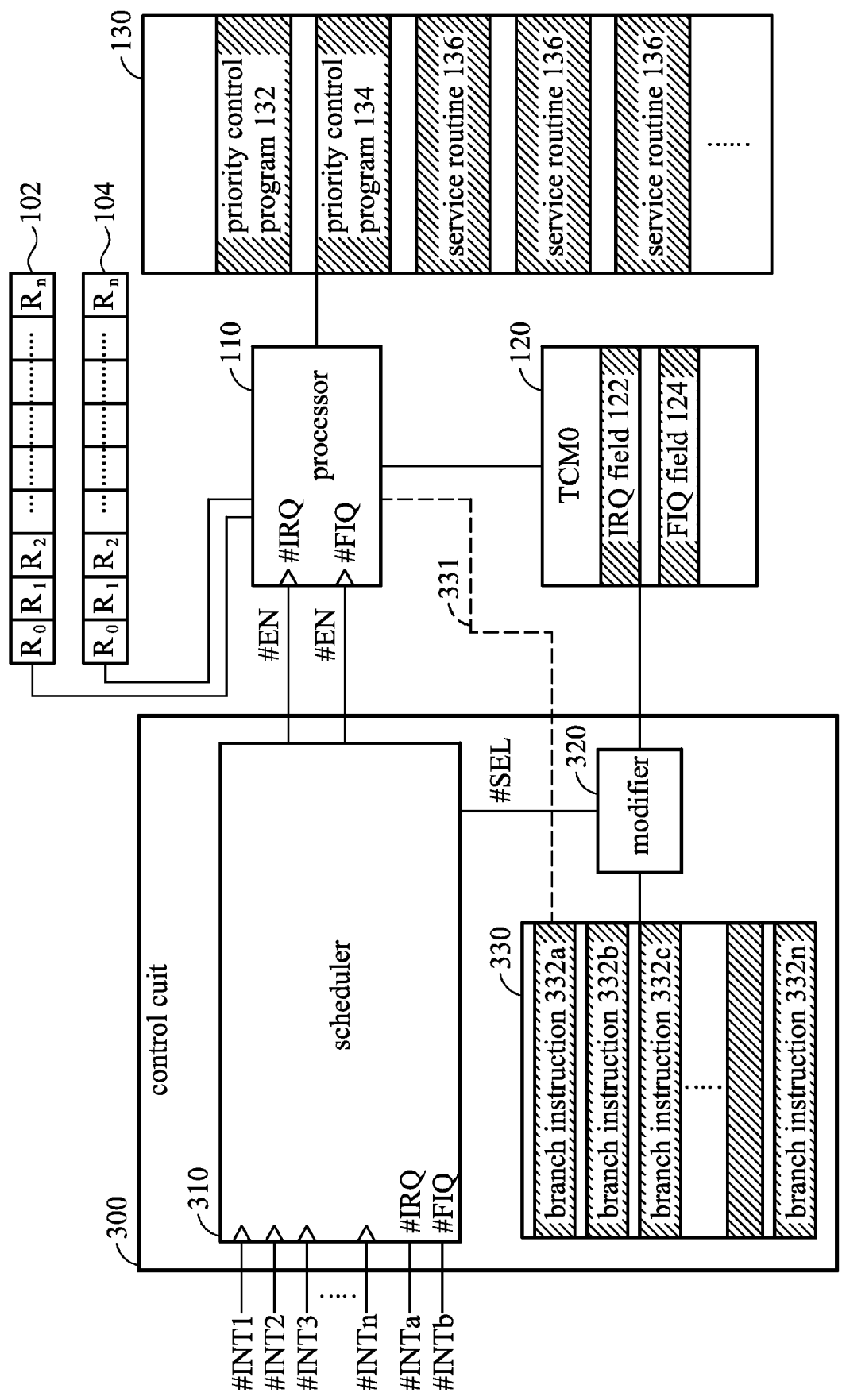
FIG. 3 shows an embodiment of an embedded system according to the invention.

FIG. 3 shows an embodiment of an embedded system according to the invention. A control unit 300 is coupled to the input ports of processor 110 as a proxy to provide hardware based priority control. The control unit 300 is capable of simultaneously receiving a plurality of interruption requests #INT (#INT1 to #INTn) via dedicated ports each associated with an event. The interruption requests #INT are buffered in the control unit 300 for priority arrangement. After the arrangement, the control unit 300 triggers the processor 110 to execute corresponding service routines via the ports #IRQ or #FIQ. When a specific service routine of the service routines is chosen to be executed, the control unit 300 dynamically renders a specific branch instruction destined to the specific service routine, and asserts an enable signal #EN to the processor 110 to trigger the processor 110 to execute the specific branch instruction, such that the specific service routine corresponding to the chosen interruption request #INT is initialized.

As an embodiment, the control unit 300 includes a scheduler 310, a modifier 320 and a spare vector table 330. The scheduler 310 has a plurality of ports each receive a different interruption request #INT. Each of the received interruption request may be dynamically programmed with a different priority factors, thereby the priority control can be made flexible. The ports may simultaneously receive various interruption requests #INT, and through the scheduler 310, corresponding service routines are scheduled in real time. While there is any unhandled interruption request buffered in the scheduler 310, the one with most priority will be first chosen to be handled. Examples are given below to explain how to trigger a service routine corresponding to the chosen interruption request #INT.

As described, the processor 110 will suspend its current operation to execute the branch instructions stored in the fields 122 or 124 upon receipt of an enable signal #EN on the ports #IRQ or #FIQ, whereby further subroutines are loaded and executed. According to inherent design of the embedded system, the processor 110 automatically refers to the interruption vector table 120 to execute the branch instructions when the enable signal #EN is asserted. In one embodiment, the control unit 300 modifies the field 122 or 124 before triggering the processor 110 by the enable signal #EN. To accomplish this, the modifier 320 and spare vector table 330 in the control unit 300 are incorporated. The spare vector table 330 is a spare space comprising a plurality of branch instructions 332 (332a to 332n) each destined to a corresponding service routine in the memory device 130. The modifier 320 is a slave circuit controlled by the scheduler 310 to perform the modification of the fields 122 and 124. In the control unit 300, when a interruption request #INT associated with a specific service routine 136 is scheduled to be handled by the processor 110, the scheduler 310 sends a selection signal #SEL to the modifier 320, causing the modifier 320 to copy a branch instruction 332 destined to the specific service routine 136 from the spare vector table 330 to the field 122 or 124. Thereafter, the scheduler 310 sends the enable signal #EN to the processor 110 via the ports #IRQ or #FIQ, causing the processor 110 to execute the copied branch instruction in the field 122 or 124. In this way, the specific service routine 136 is accessed and executed by processor 110, whereby the inefficient software based priority control program is skipped and the performance is significantly improved.

In an alternative embodiment, the interruption vector table 120 may be a read-only device in which modification is prohibited. In this case, the control unit 300 remaps the field 122 or 124, so that the processor 110 is able to access the branch instruction 332 destined to the specific service routine 136 stored in the spare vector table 330. By control of firmware or operation system, entry addresses of the fields 122 and 124 are remapped to the spare vector table 330 where the branch instructions 332 are stored. Such that the processor 110 accesses and loads the branch instruction 332 from the spare vector table 330 instead of from the field 122 or 124.

In another embodiment of the invention, while at least two interruption request #INT are scheduled to be handled by processor 110, the scheduler 310 first modifies the IRQ field 122 with a first branch instruction and sends the enable signal #EN to the port #IRQ, triggering the processor 110 to process related routines. Simultaneously during the processor 110 is handling the first interruption request, the scheduler 310 modifies the FIQ field 124 with a second branch instruction destined to a second service routine. Such a pipelined operation makes use of idle parts to increase the entire system efficiency. When the first service routine is concluded, the scheduler 310 subsequently sends the enable signal #EN to the port #FIQ to trigger execution of the second service routine, and likewise, the IRQ field 122 may be reused simultaneously to store another branch instruction destined to a next service routine.

Figure 1:
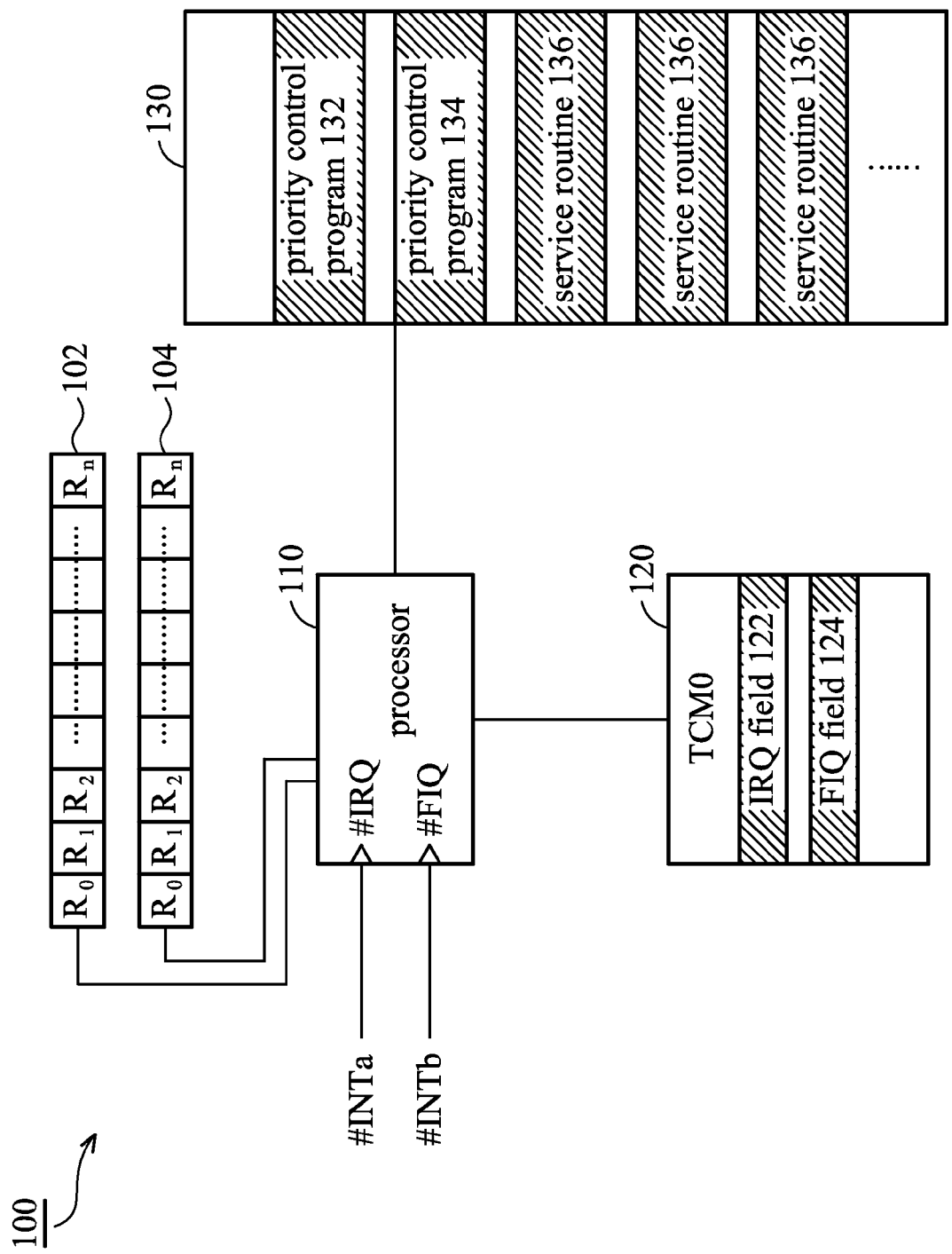
FIG. 1 shows a conventional embedded system.
Figure 2:
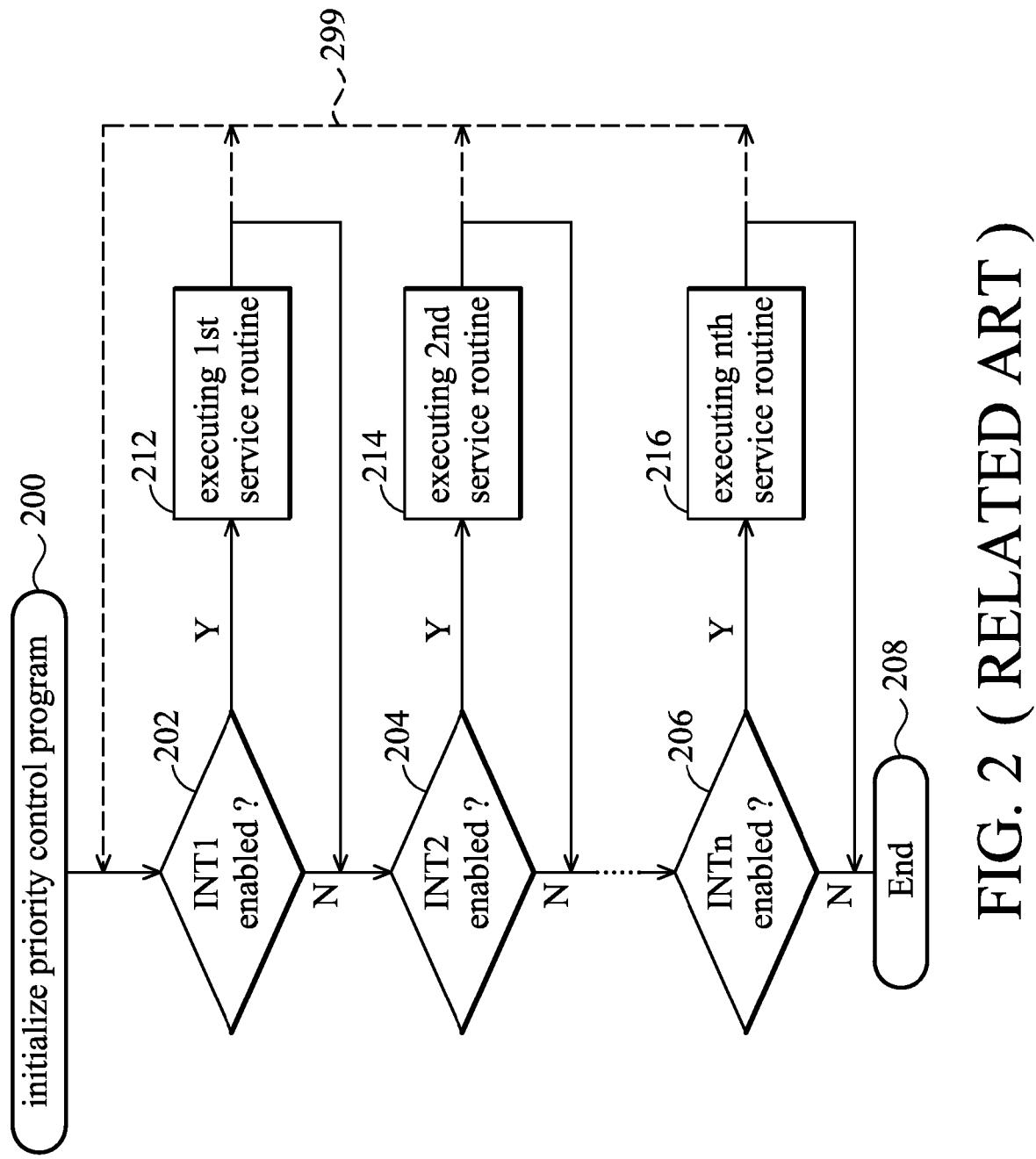
FIG. 2 is flowchart of conventional service routine executions.

The embedded system proposed in FIG. 3 has a backward compatibility. The scheduler 310 may further comprise same ports #IRQ and #FIQ as the processor 110 in FIG. 1 to accept conventional interruption requests #INTa and #INTb. When a conventional interruption request #INTa or #INTb is received, the corresponding field 122 or 124 is modified with conventional branch instructions which are destined to the priority control program 132 and 134, such that the processor 110 acts in a conventional way, scanning the status register 102 or 104 as described in FIG. 2.

Figure 4:
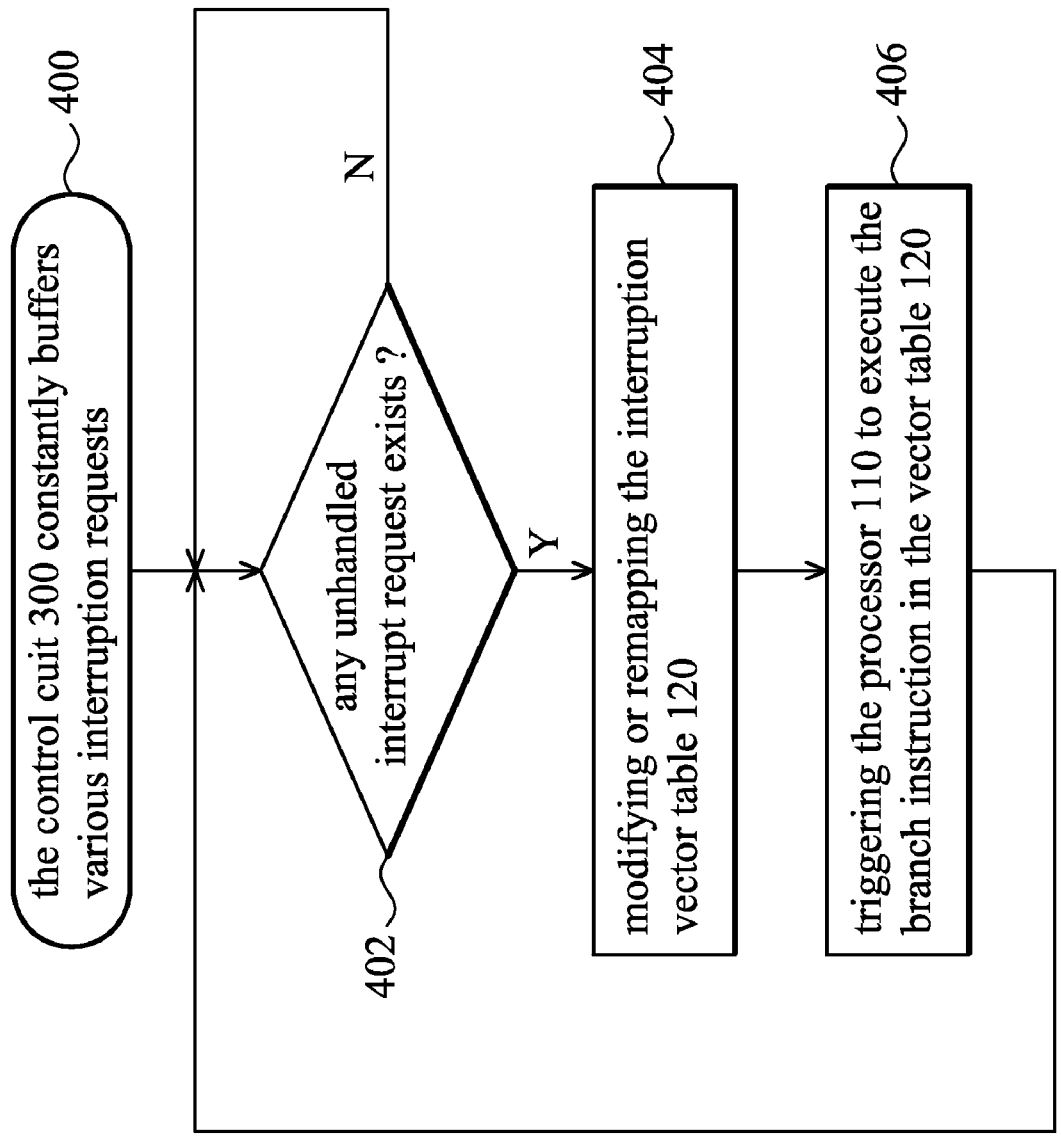
FIG. 4 is a flowchart of prioritized service routine executions.

FIG. 4 is a flowchart of prioritized service routine executions. The hardware based interruption handling method with priority control implemented in the embedded system with a control unit 300 can be summarized as follows. In step 400, the control unit 300 constantly buffers various interruption requests. In step 402, it is determined whether any unhandled interrupt request exists. If so, the one with highest priority is chosen to be handled, and modification or remapping of the interruption vector table 120 is performed in step 404. In step 406, after the branch instructions are prepared, the control unit 300 sends an enable signal #EN to trigger the processor 110 to initialize further operations. When the processor 110 finishes a service routine, the process returns to step 402.

The embodiment is particularly adaptable for DVD recorder in which interrupt requests for encoding is critical while recording data to a disc. Various interruption requests may have different priorities under different modes, and through the control unit 300, priority of each interruption request can be flexibly configured. The control unit 300 may be implemented by simple logic circuits with low cost, and the architecture is not specifically limited to the block diagram in FIG. 3. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An embedded system, receiving a plurality of interruption requests to trigger corresponding service routines, comprising:
   a memory device, comprising a plurality of service routines stored at different entry addresses, each related to an interruption request;
   a processor, coupled to the memory device, receiving an enable signal to initialize one of the service routines through a branch instruction;
   an interruption vector table coupled to the processor, comprising at least one field storing the branch instruction; and
   a control unit, coupled to the processor, buffering the interruption requests to schedule executions of corresponding service routines, modifying the branch instruction stored in the field; wherein when a specific service routine is to be executed, the control unit provides the modified branch instruction pointing to an entry address of the specific service routine and asserts the enable signal to the processor, such that the processor executes the modified branch instruction to initialize the specific service routine.

2. The embedded system as claimed in claim 1; wherein the control unit further comprises a scheduler, comprising a plurality of ports each receiving an interruption request; wherein priorities of the received interruption request are programmable, and the scheduler asserts the enable signal to sequentially handle the buffered interruption requests based on priorities of the interruption request.

3. The embedded system as claimed in claim 2, wherein the scheduler further comprises a conventional port to accept a conventional interruption request.

4. The embedded system as claimed in claim 3, wherein when the conventional interruption request is received, the processor scans a status register.

5. The embedded system as claimed in claim 1, wherein the control unit comprises a spare vector table, storing a plurality of branch instructions each destined to a corresponding service routine in the memory device.

6. The embedded system as claimed in claim 5, wherein:
   the control unit further comprises a modifier coupled to the spare vector table, controlled by a scheduler; and
   when the specific service routine is to be executed, the modifier copies the branch instruction destined to the specific service routine from the spare vector table to the field in the interruption vector table, such that the processor is led to access the specific service routine accordingly.

7. The embedded system as claimed in claim 6, wherein:
   the processor comprises a first port and a second port for triggering service routines;
   the interruption vector table comprises a first field and a second field for storage of branch instructions;
   when a first interruption request and a second interruption request are scheduled to be handled where priority of the first interruption request is higher than that of the second interruption request, the modifier, under control of the scheduler, modifies the first field with a first branch instruction destined to a first service routine, and sends the enable signal to the first port, such that the processor executes the first branch instruction in the first field to initialize the first service routine;
   while the processor is executing the first service routine, the modifier, under control of the scheduler, simultaneously modifies the second field with a second branch instruction destined to a second service routine; and
   when the second field is modified, the scheduler sends the enable signal to the second port for triggering execution of the second service routine.

8. An interruption handling method, receiving a plurality of interruption requests to trigger corresponding service routines, comprising:
   providing a memory device for storage of a plurality of service routines each related to an interruption request;
   receiving an enable signal to initialize one of the service routines through a branch instruction;
   providing an interruption vector table comprising at least one field storing the branch instruction;
   buffering the interruption requests;
   modifying the branch instruction stored in the field;
   when a specific service routine is to be executed, providing the modified branch instruction pointing to an entry address of the specific service routine; and
   executing the modified branch instruction to initialize the specific service routine.

9. The interruption handling method as claimed in claim 8, further comprising:
   providing a plurality of ports each receiving an interruption request, wherein priorities of the received interruption request are programmable; and
   sequentially handling the buffered interruption requests based on priorities of the interruption request.

10. The interruption handling method as claimed in claim 8, further comprising:
   using a processor to load the modified branch instruction from the interruption vector table and initialize the specific service routine.

11. The interruption handling method as claimed in claim 10, further comprising providing a spare vector table for storage of a plurality of branch instructions each destined to a corresponding service routine in the memory device.

12. The interruption handling method as claimed in claim 11, further comprising copying the branch instruction destined to the specific service routine from the spare vector table to the field in the interruption vector table when the specific service routine is to be executed, such that the processor is led to access the specific service routine according to the branch instruction in the interruption vector table.

13. The interruption handling method as claimed in claim 12, wherein:
the processor comprises a first port and a second port for triggering service routines;
the interruption vector table comprises a first field and a second field for storage of branch instructions; and
the interruption handling method further comprising:
when a first interruption request and a second interruption request are scheduled to be handled where priority of the first interruption request is higher than that of the second interruption request, modifying the first field with a first branch instruction destined to a first service routine, and triggering the processor via the first port to execute the first branch instruction in the first field and initialize the first service routine;
while the processor is executing the first service routine, simultaneously modifying the second field with a second branch instruction destined to a second service routine; and
when the second field is modified, sending the enable signal to the second port for triggering execution of the second service routine.

14. The interruption handling method as claimed in claim 9, further comprising:
providing a conventional port to accept a conventional interruption request.

15. The interruption handling method as claimed in claim 14, further comprising:
scanning a status register when the conventional interruption request is received.

* * * * *